United States Patent
Kim et al.

(10) Patent No.: US 8,389,176 B2
(45) Date of Patent: Mar. 5, 2013

(54) POLYMER MEMBRANE COMPOSITION FOR FUEL CELL, POLYMER MEMBRANE PREPARED THEREFROM, MEMBRANE-ELECTRODE ASSEMBLY, FUEL CELL INCLUDING THE SAME, AND ASSOCIATED METHODS

(75) Inventors: Tae-Kyoung Kim, Uiwang-si (KR);
Yeong-Suk Choi, Uiwang-si (KR);
Myung-Jin Lee, Seoul (KR)

(73) Assignee: Cheil Industries, Inc., Gumi-si, Kyeongsangbuk-do (KR)

(*) Notice: Subject to any disclaimer, the term of this patent is extended or adjusted under 35 U.S.C. 154(b) by 423 days.

(21) Appl. No.: 12/654,741

(22) Filed: Dec. 30, 2009

(65) Prior Publication Data

US 2011/0059385 A1 Mar. 10, 2011

(30) Foreign Application Priority Data

Sep. 10, 2009 (KR) ........................ 10-2009-0085597

(51) Int. Cl.
*H01M 8/10* (2006.01)
(52) U.S. Cl. ........................ 429/491; 429/492; 429/493
(58) Field of Classification Search .................. 429/483, 429/491, 492, 493; 521/27
See application file for complete search history.

(56) References Cited

U.S. PATENT DOCUMENTS

| | | | |
|---|---|---|---|
| 8,211,588 B2 * | 7/2012 | Choi et al. | ..................... 429/491 |
| 2007/0122676 A1 | 5/2007 | Song | |
| 2007/0259240 A1 * | 11/2007 | Hedhli et al. | ..................... 429/33 |
| 2008/0233451 A1 | 9/2008 | Hong et al. | |
| 2009/0169955 A1 | 7/2009 | Uensal et al. | |
| 2010/0197816 A1 * | 8/2010 | Goldbach et al. | ............... 521/27 |

FOREIGN PATENT DOCUMENTS

| | | |
|---|---|---|
| KR | 10-0709220 B1 | 4/2007 |
| KR | 10-2007-0056324 A | 6/2007 |
| KR | 10-0819332 B1 | 3/2008 |
| KR | 10-2008-0063378 A | 7/2008 |
| KR | 10-2009-0088646 A | 8/2009 |
| WO | WO 2008/062932 A1 | 5/2008 |
| WO | WO 2008076637 A1 * | 6/2008 |

OTHER PUBLICATIONS

S. Zhong, X. Cui, H. Cai, T. Fu, K. Shao, H. Na. Crosslinked SPEEK/AMPS blend membranes with high proton conductivity and low methanol diffusion coefficient for DMFC applications, J. Power Sources 2007, 168, 154-161.*

S. Zhong, T. Fu, Z. Dou, C. Zhao, H. Na. Preparation and evaluation of a proton exchange membrane based on crosslinkable sulfonated poly(ether ether ketone)s, J. Power Sources 2006, 162, 51-57.*

Wang, et al.; Direct polymerization of sulfonated poly(arylene ether sulfone) random (statistical) copolymers: candidates for new proton exchange membranes; Journal of Membrane Science, 2002; pp. 231-242; vol. 197; Elsevier Science B.V.; United States.

* cited by examiner

*Primary Examiner* — Carlos Barcena
(74) *Attorney, Agent, or Firm* — Lee & Morse, P.C.

(57) ABSTRACT

A polymer membrane composition for a fuel cell, a polymer membrane prepared therefrom, a membrane electrode assembly, a fuel cell including the same, and associated methods, the polymer membrane composition including a polymer, the polymer including a cation exchange group and a carbon double-bond-containing cross-linkable group, a (meth)acryl-based compound, the (meth)acryl-based compound including a cation exchange group, and a polymerization initiator.

15 Claims, 9 Drawing Sheets

POLYMER MEMBRANE COMPOSITION FOR FUEL CELL, POLYMER MEMBRANE PREPARED THEREFROM, MEMBRANE-ELECTRODE ASSEMBLY, FUEL CELL INCLUDING THE SAME, AND ASSOCIATED METHODS

BACKGROUND

1. Field

Embodiments relate to a polymer membrane composition for a fuel cell, a polymer membrane prepared therefrom, a membrane-electrode assembly (MEA), a fuel cell including the same, and associated methods.

2. Description of the Related Art

A fuel cell is a power generation system for producing electrical energy through, e.g., an electrochemical redox reaction of hydrogen and oxygen from a hydrocarbon-based material, e.g., methanol, ethanol, and/or natural gas.

Fuel cells are a clean energy source that may replace a fossil fuel. A fuel cell may include a stack composed of unit cells and may have an advantage of producing power in various ranges. Since fuel cells may have four to ten times higher energy density than a small lithium battery, may not release $NO_x$ or $CO_2$, and may not be noisy, fuel cells have been highlighted as a next generation energy converter.

A fuel cell may include, e.g., a polymer electrolyte membrane fuel cell (PEMFC) and a direct oxidation fuel cell (DOFC). A direct oxidation fuel cell that uses methanol as a fuel is called a direct methanol fuel cell (DMFC).

The polymer electrolyte membrane fuel cell may have an advantage of having high energy density and power. However, the polymer electrolyte membrane fuel cell may also require careful handling of hydrogen gas and accessory facilities, e.g., a fuel-reforming processor for reforming a fuel gas such as methane, methanol, and natural gas, in order to produce hydrogen.

The direct oxidation fuel cell may have a lower energy density than the polymer electrolyte membrane fuel cell. However, the direct oxidation fuel cell may have an advantage of easy handling of a liquid-type fuel, a low operation temperature, and no additional fuel-reforming processor.

In the direct oxidation fuel cell, a stack that actually generates electricity may include several to scores of unit cells stacked in multi-layers. Each unit cell may be made up of a membrane-electrode assembly (MEA) and a separator (also referred to as a bipolar plate). The MEA may include an anode (referred to as a fuel electrode or an oxidation electrode) and a cathode (referred to as an air electrode or a reduction electrode) attached to each other with an electrolyte membrane therebetween.

A fuel may be supplied to an anode and adsorbed on catalysts of the anode and then oxidized to produce protons and electrons. The electrons may be transferred into a cathode via an external circuit and the protons may be transferred into the cathode through the polymer electrolyte membrane. In addition, an oxidant may be supplied to the cathode. Then, the oxidant, protons, and electrons may be reacted on catalysts of the cathode to produce electricity along with water.

SUMMARY

Embodiments are directed to a polymer membrane composition for a fuel cell, a polymer membrane prepared therefrom, a membrane-electrode assembly (MEA), a fuel cell including the same, and associated methods, which substantially overcome one or more of the problems due to the limitations and disadvantages of the related art.

It is a feature of an embodiment to provide a polymer membrane composition for a fuel cell having excellent mechanical properties, high ion conductivity, and low fuel permeability.

At least one of the above and other features and advantages may be realized by providing a polymer membrane composition for a fuel cell including a polymer, the polymer including a cation exchange group and a carbon double-bond-containing cross-linkable group, a (meth)acryl-based compound, the (meth)acryl-based compound including a cation exchange group, and a polymerization initiator.

The polymer may include at least one of a polysulfone-based polymer, a polyetherketone-based polymer, a polyether-based polymer, a polyester-based polymer, a polybenzimidazole-based polymer, and a polyimide-based polymer.

The cation exchange group may be included in the polymer in an amount of about 0.3 to about 2.5 mmol/g.

The carbon double-bond-containing cross-linkable group may be included in the polymer in an amount of about 0.1 to about 3.0 mmol/g.

The polymer may include a repeating unit represented by the following Chemical Formula 1:

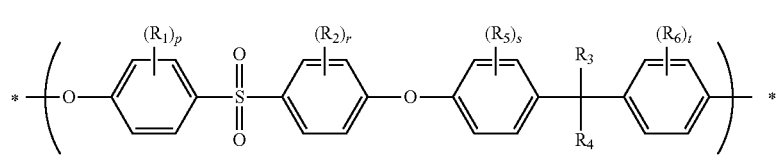

[Chemical Formula 1]

wherein, in Chemical Formula 1, $R_1$ and $R_2$ may each independently be hydrogen, a C1 to C10 alkyl group, a C2 to C10 alkenyl group, a C6 to C20 aryl group, a nitro group, an amine group, a sulfonic acid group, a phosphonic acid group, a carboxylic acid group, or a sulfoneimide group, provided that at least one of $R_1$ and $R_2$ is a sulfonic acid group, a phosphonic acid group, a carboxylic acid group, or a sulfoneimide group, $R_3$ and $R_4$ may each independently be hydrogen, —$CF_3$, a C1 to C20 alkyl group, a C2 to C20 alkenyl, a C6 to C20 aryl group, or a nitro group, $R_5$ and $R_6$ may each independently be hydrogen, a C1 to C10 alkyl group, a C6 to C20 aryl group, a nitro group, an amine group, a C2 to C20 alkenyl group, an ally group, or a (meth)acryloyl group, provided that at least one of $R_5$ and $R_6$ is a C2 to C20 alkenyl group, an allyl group, or a (meth)acryloyl group, and p, r, s, and t may each independently be integers of 0 to 4, provided that p and r are not simultaneously zero (0), and s and t are not simultaneously zero (0).

The polymer may be represented by the following Chemical Formula 2:

[Chemical Formula 2]

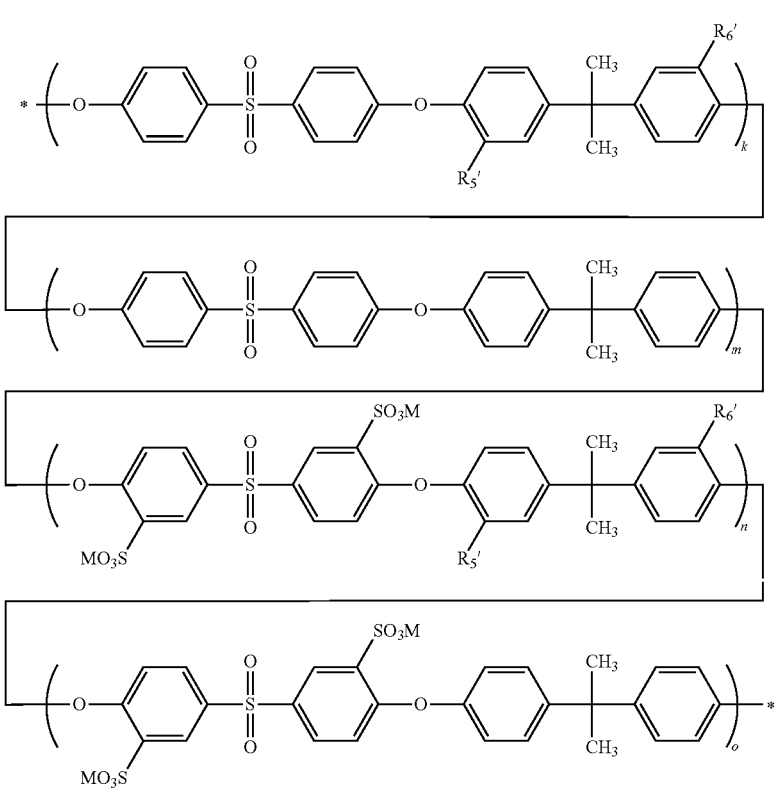

wherein, in Chemical Formula 2, $R_{5'}$ and $R_{6'}$ may each independently be a C2 to C20 alkenyl or an allyl group, M may be $Na^+$, $K^+$, or H, and k, m, n, and o may indicate a mole number.

The polymer may have a number average molecular weight (Mn) of about 100,000 to about 1,500,000.

The (meth)acryl-based compound may be represented by at least one of Chemical Formulae 4, 5, and 6:

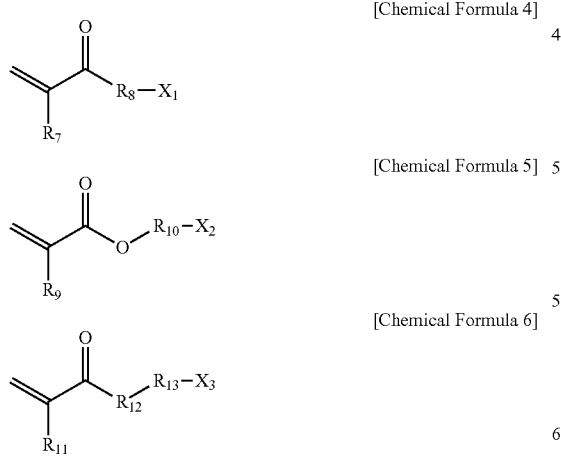

[Chemical Formula 4]

[Chemical Formula 5]

[Chemical Formula 6]

wherein, in Chemical Formulae 4, 5, and 6, $R_7$, $R_9$, and $R_{11}$ may each independently be hydrogen, a C1 to C20 alkyl group, a C2 to C20 alkenyl group, a C6 to C20 aryl group, a nitro group, or an amine group, $R_8$, $R_{10}$, and $R_{13}$ may each independently be a C1 to C20 alkylene group, a C6 to C20 arylene group, —NH—, or —NR— (R is a C1 to C10 alkyl), $R_{12}$ may be —NH— or —NR— (R is a C1 to C10 alkyl), and $X_1$, $X_2$, and $X_3$ may each independently be a sulfonic acid group, a phosphonic acid group, a carboxylic acid group, or a sulfoneimide group.

The (meth)acryl-based compound may be a sulfonated (meth)acryl-based compound.

The (meth)acryl-based compound may include at least one of 3-sulfopropyl acrylate, 3-sulfopropyl methacrylate, and 2-acrylamino-2-methyl-1-propanesulfonic acid.

The (meth)acryl-based compound may be included in an amount of about 1 to about 30 parts by weight, based on 100 parts by weight of the polymer including the cation exchange group and carbon double-bond-containing cross-linkable group.

The (meth)acryl-based compound may be included in an amount of about 1 to about 20 parts by weight, based on 100 parts by weight of the polymer including the cation exchange group and carbon double-bond-containing cross-linkable group.

The polymerization initiator may include an ultraviolet (UV) polymerization initiator or a thermal polymerization initiator.

The polymerization initiator may be included in an amount of about 1 to about 10 parts by weight, based on 100 parts by weight of the polymer and the (meth)acryl-based compound.

At least one of the above and other features and advantages may also be realized by providing a polymer membrane for a fuel cell including a cross-linked polymer produced through a cross-linking reaction of a polymer including a cation exchange group and a carbon double-bond-containing cross-linkable group with a (meth)acryl-based compound including a cation exchange group.

At least one of the above and other features and advantages may also be realized by providing a membrane-electrode assembly (MEA) including the polymer membrane of an embodiment, and electrodes at respective sides of the polymer membrane, the electrodes including a catalyst layer and a gas diffusion layer.

At least one of the above and other features and advantages may also be realized by providing a fuel cell including the membrane-electrode assembly of an embodiment, and bipolar plates disposed at respective sides of the membrane-electrode assembly.

At least one of the above and other features and advantages may also be realized by providing a method of manufacturing a polymer membrane for a fuel cell, the method including providing a polymer membrane composition; the polymer membrane composition including a polymer including a cation exchange group and a carbon double-bond-containing cross-linkable group, a (meth)acryl-based compound including a cation exchange group, and a polymerization initiator, coating the polymer membrane composition on a substrate, and cross-linking the polymer and the (meth)acrylic compound by activating the polymerization initiator.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
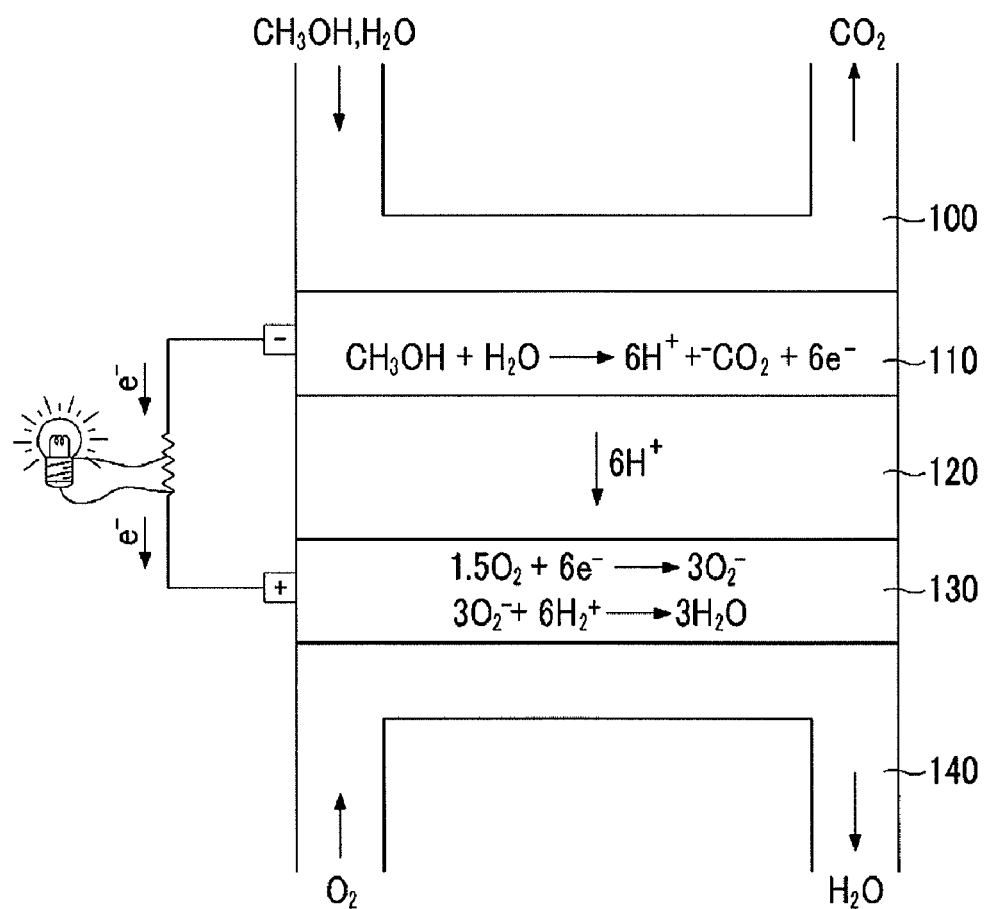
FIG. 1 illustrates a schematic diagram showing power generation in a direct methanol fuel cell including a polymer membrane according to an embodiment.

Korean Patent Application No. 10-2009-0085597, filed on Sep. 10, 2009, in the Korean Intellectual Property Office, and entitled: "Polymer Membrane Composition for Fuel Cell, Polymer Membrane Prepared Therefrom, and Membrane-Electrode Assembly and Fuel Cell Including Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

In this specification, a "(meth)acryloyl group" indicates both a methacryloyl group and an acryloyl group, and a "(meth)acryl-based compound" indicates both a methacryl-based compound and an acryl-based compound.

In the Chemical Formulae, "*" indicates a bond connected to an element.

Polymer Membrane Composition for a Fuel Cell

According to an embodiment, a polymer membrane composition for a fuel cell may include, e.g., a polymer including a cation exchange group and a carbon double-bond-containing cross-linkable group, a (meth)acryl-based compound including a cation exchange group, and a polymerization initiator.

(A) Polymer Including a Cation Exchange Group and a Carbon Double-Bond-Containing Cross-Linkable Group According to an embodiment, a polymer membrane composition for a fuel cell may include, e.g., a polymer including a cation exchange group and a carbon double-bond-containing cross-linkable group. The polymer may be a main component of the polymer membrane composition.

The polymer may include, e.g., a polysulfone-based polymer, a polyetherketone-based polymer, a polyether-based polymer, a polyester-based polymer, a polybenzimidazole-based polymer, a polyimide-based polymer, and/or combinations thereof.

In the polymer, the cation exchange group may include, e.g., an acid or a salt. However, the salt may become an acid through an acid treatment process, after it is prepared into a polymer membrane.

The cation exchange group may include, e.g., a sulfonic acid group, a phosphonic acid group, a carboxylic acid group, a sulfoneimide group, and/or combinations thereof. In an implementation, the cation exchange group may be, e.g., a sulfonic acid group.

In the polymer, the carbon double-bond-containing cross-linkable group may be, e.g., a functional group having more than one carbon double bond. In an implementation, the carbon double-bond-containing cross-linkable group may include, e.g., an allyl group, an alkenyl group, a (meth)acryloyl group, and the like. The alkenyl group may include, e.g., a vinyl group.

The polymer may include a repeating unit represented by the following Chemical Formula 1.

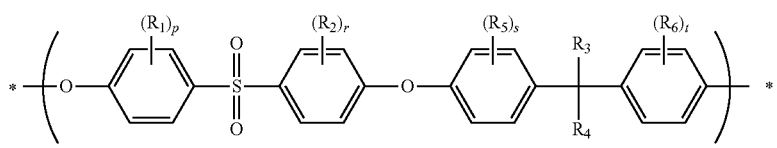

[Chemical Formula 1]

In the above Chemical Formula 1, $R_1$ and $R_2$ may each independently be, e.g., hydrogen, a C1 to C10 alkyl group, a C2 to C10 alkenyl group, a C6 to C20 aryl group, a nitro group, an amine group, a sulfonic acid group, a phosphonic acid group, a carboxylic acid group, or a sulfoneimide group, provided that at least one of $R_1$ and $R_2$ is a sulfonic acid group, a phosphonic acid group, a carboxylic acid group, or a sulfoneimide group. In Chemical Formula 1, $R_3$ and $R_4$ may each independently be, e.g., hydrogen, —$CF_3$, a C1 to C20 alkyl group, a C2 to C20 alkenyl group, a C6 to C20 aryl group, or a nitro group. In Chemical Formula 1, $R_5$ and $R_6$ may each independently be, e.g, hydrogen, a C1 to C10 alkyl group, a C6 to C20 aryl group, a nitro group, an amine group, a C2 to C20 alkenyl group, such as a vinyl group, an allyl group, or a (meth)acryloyl group, provided that at least one of $R_5$ and $R_6$ is a C2 to C20 alkenyl group, an allyl group, or a (meth)acryloyl group. In Chemical Formula 1, p, r, s, and t may each independently be an integer of 0 to 4, provided that p and r are not simultaneously zero (0), and s and t are not simultaneously zero (0), i.e., at least one of p and r is 1, 2, 3, or 4 and at least one of s and t is 1, 2, 3, or 4.

In the above Chemical Formula 1, at least one of $R_1$ and $R_2$, as a substituent of an arylene group, may be a cation exchange group.

The cation exchange group may be included in the polymer in an amount, i.e., have an ion exchange capacity (IEC), of about 0.3 to about 2.5 mmol/g. The IEC may be measured in terms of, e.g., mmol of cation exchange group per gram of polymer. Maintaining the amount of the cation exchange group in the polymer at about 0.3 to about 2.5 mmol/g may help ensure appropriate ion conductivity for a resultant fuel cell. Maintaining the amount of the cation exchange group at about 2.5 mmol/g or less may help ensure that mechanical properties of a resultant fuel cell are not deteriorated, e.g., due to increasing swelling of a polymer membrane when it is wet, and flexibility is not deteriorated when dry. In addition, maintaining the amount of the cation exchange group at about 2.5 mmol/g or less may help ensure that permeability of methanol and other liquid fuels does not increase, thus maintaining performance efficiency of a resultant fuel cell. Maintaining the amount of the cation exchange group in the polymer in an amount of about 0.3 mmol/g or greater may help ensure that a resultant polymer membrane exhibits sufficient ion conductivity and may be appropriately used in a fuel cell.

The polymer may also include the carbon double-bond-containing cross-linkable group in an amount of about 0.1 to about 3.0 mmol/g. Maintaining the amount of the cross-linkable group at about 0.1 to about 3.0 mmol/g may help improve mechanical properties of a polymer membrane prepared from the polymer membrane composition and prevent sharp degradation of Tg (glass transition temperature) of the polymer membrane, thereby improving durability.

Since the polymer may include the carbon double-bond-containing cross-linkable group as well as the cation exchange group, it may undergo a cross-linking reaction with other polymers as well as with the (meth)acryl-based compound including a cross-linking group, e.g., a (meth)acryloyl group.

A polymer membrane prepared from the polymer membrane composition of an embodiment may exhibit various solvent-resistance characteristics depending on the content of the cross-linkable group in the polymer. In other words, when a cross-linked polymer produced through a cross-linking reaction has a high cross-linking degree, the polymer may not be dissolved in a solvent, but may rather be swollen.

The polymer including a cation exchange group and a carbon double-bond-containing cross-linkable group may be represented by the following Chemical Formula 2.

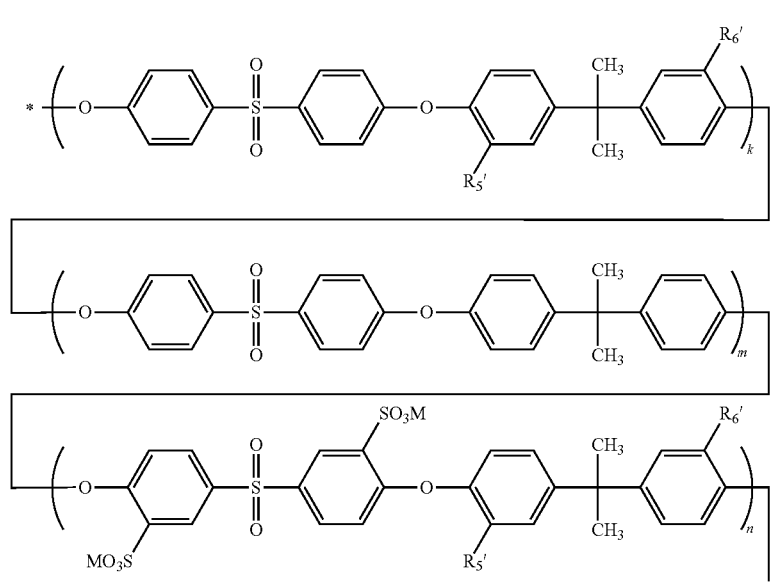

[Chemical Formula 2]

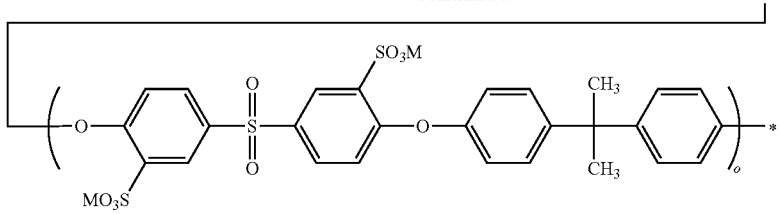

In the above Chemical Formula 2, $R_5'$ and $R_6'$ may each independently be a carbon double-bond-containing cross-linkable group, e.g., an allyl group, a C2 to C20 alkenyl group, a (meth)acryloyl group, and the like. In Chemical Formula 2, M may be, e.g., $Na^+$, $K^+$, or H. In Chemical Formula 2, k, m, n, and o may indicate, e.g., a mole number.

In the above Chemical Formula 2, $R_5'$ and $R_6'$ may be bonded, e.g., one per respective aryl cycle of a main chain. In Chemical Formula 2, when $R_5'$ and $R_6'$ are all allyl groups, the polymer may be represented by the following Chemical Formula 3.

bisphenol-A may be used as a monomer for synthesizing polyarylethersulfone. The diallyl bisphenol-A may be used in amounts suitable to control the aforementioned cross-linking degrees.

The polymer may have a number average molecular weight (Mn) of about 100,000 to about 1,500,000. In an implementation, the polymer may have a number average molecular weight (Mn) of about 300,000 to about 1,000,000. Maintaining the number average molecular weight (Mn) at about 100,000 to about 1,500,000 may help ensure that a resultant polymer membrane has excellent mechanical properties. Accordingly, when the resultant polymer membrane of an

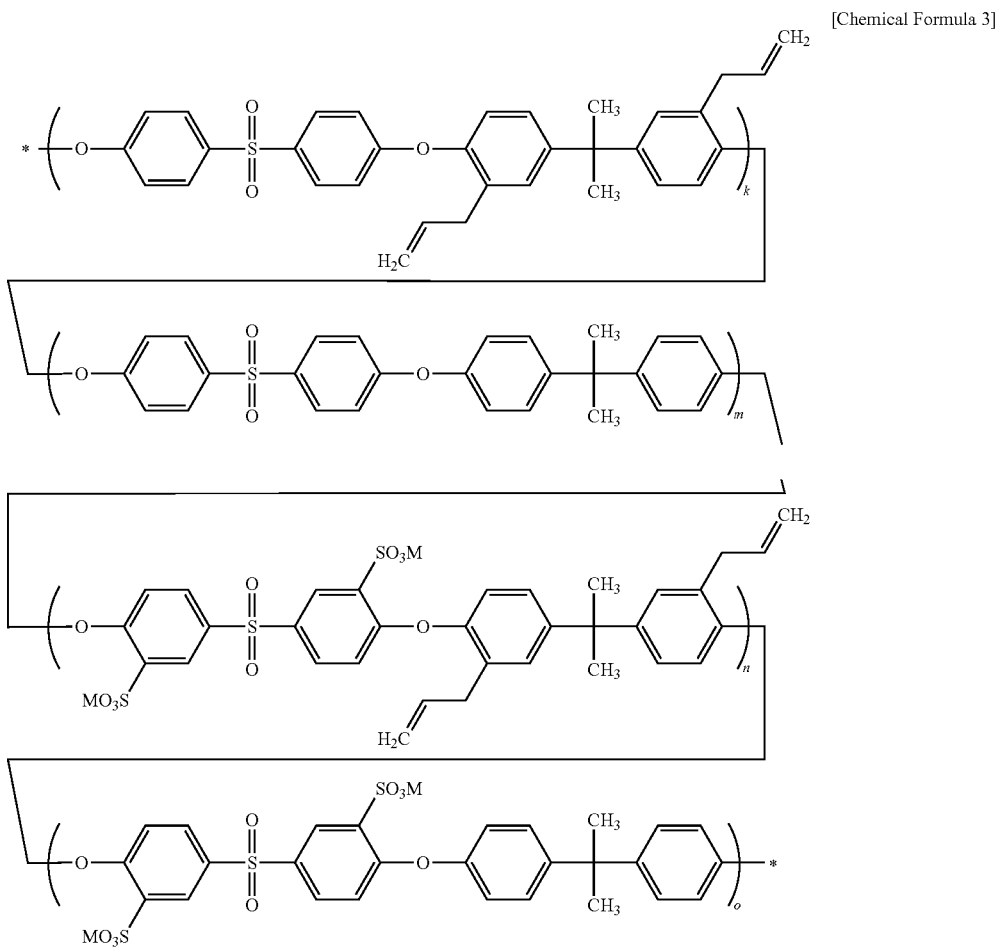

[Chemical Formula 3]

In the above Chemical Formula 3, M may be, e.g., $Na^+$, $K^+$, or H, and k, m, n, and o may indicate a mole number.

In an implementation, when preparing a polymer including an allyl group as represented by Chemical Formula 3, diallyl embodiment is used for a membrane-electrode assembly and a stack, it may decrease cracks caused by, e.g., high temperature and pressure. Furthermore, when the resultant polymer membrane of an embodiment is used for a membrane-electrode assembly and a stack, the membrane may not be broken and/or dissolved during long-term operation of a fuel cell, thus improving durability of the fuel cell.

(B) (Meth)acryl-Based Compound

In an implementation, the (meth)acryl-based compound may be a compound including a cation exchange group and a (meth)acryloyl group.

The cation exchange group may include, e.g., a sulfonic acid group, a phosphonic acid group, a carboxylic acid group, a sulfoneimide group, or combinations thereof. In an implementation, the cation exchange group may include, e.g., a sulfonic acid group.

The (meth)acryl-based compound may be represented by, e.g., one of the following Chemical Formulae 4, 5, and 6, or a combination thereof.

[Chemical Formula 4]

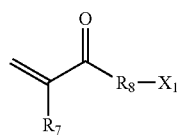

[Chemical Formula 5]

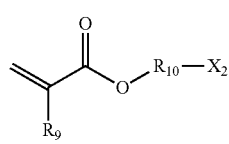

[Chemical Formula 6]

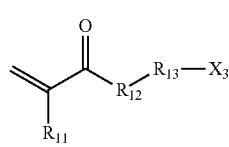

In Chemical Formulae 4 to 6, $R_7$, $R_9$, and $R_{11}$ may each independently be, e.g., hydrogen, a C1 to C20 alkyl group, a C2 to C20 alkenyl group, a C6 to C20 aryl group, such as a phenyl group, a nitro group, or an amine group. In Chemical Formulae 4 to 6, $R_8$, $R_{10}$, and $R_{13}$ may each independently be, e.g., a C1 to C20 alkylene group, a C6 to C20 arylene group, —NH—, or —NR— (R is a C1 to C10 alkyl). In Chemical Formula 6, $R_{12}$ may be, e.g., —NH— or —NR— (R is a C1 to C10 alkyl). In Chemical Formulae 4 to 6, $X_1$, $X_2$, and $X_3$ may each independently be, e.g., a sulfonic acid group, a phosphonic acid group, a carboxylic acid group, or a sulfoneimide group The (meth)acryl-based compound may undergo a cross-linking reaction with the polymer including the carbon double-bond-containing cross-linkable group, thus providing a cross-linked polymer having various structures.

The (meth)acryl-based compound may include, e.g., a sulfonated (meth)acryl-based compound such as 3-sulfopropyl acrylate (SPA), 3-sulfopropyl methacrylate, 2-acrylamino-2-methyl-1-propanesulfonic acid, and the like.

In the polymer membrane composition for a fuel cell, the (meth)acryl-based compound may be included in an amount of about 1 to about 30 parts by weight, based on 100 parts by weight of the polymer including a cation exchange group and a carbon double-bond-containing cross-linkable group. In an implementation, the (meth)acryl-based compound may be included in an amount of about 1 to about 20 parts by weight, based on 100 parts by weight of the polymer. Maintaining the amount of the (meth)acryl-based compound at about 1 to about 30 parts by weight may help ensure an appropriate cross-linking degree with the polymer including the carbon double bond-containing cross-linkable group after the cross-linking reaction. Thus, mechanical properties of a polymer membrane may be improved and deterioration thereof may be prevented, since a cross-linked polymer produced through a side reaction between the (meth)acryl-based compounds may not be excessively included.

(C) Polymerization Initiator

The polymer membrane for a fuel cell may be prepared through, e.g., an ultraviolet (UV) cross-linking or thermal cross-linking process. Accordingly, the polymer membrane composition for a fuel cell may include, e.g., an ultraviolet (UV) polymerization initiator for the ultraviolet (UV) cross-linking process or a thermal polymerization initiator for the thermal cross-linking process.

(C1) Ultraviolet (UV) Polymerization Initiator

When the polymer membrane composition is cross-linked by an ultraviolet (UV) polymerization reaction of the polymer and the (meth)acryl-based compound, it may further include an ultraviolet (UV) polymerization initiator for producing a radical during ultraviolet (UV) irradiation.

The ultraviolet (UV) polymerization initiator may include, e.g., acetophenones such as diethoxyacetophenone, benzyldimethylketal, 1-hydroxycyclohexyl-phenylketone, and the like, benzoinethers such as benzoinmethylether, benzomethylether, benzoinisopropylether, benzoinisobutylether, and the like, benzophenones such as 4-phenylbenzophenone, (4-benzoylbenzyl)trimethylammoniumchloride, and the like, thioxanthones such as 2,4-diethylthioxanthone, 1-chloro-4, 4'-dichlorothioxanthone, and the like, 2,4,6-trimethylbenzoyldiphenylbenzoyloxide, and the like. The ultraviolet (UV) polymerization initiator may be used alone or as a combination of two or more thereof.

The ultraviolet (UV) polymerization initiator may be included in an amount of about 1 to about 10 parts by weight, based on 100 parts by weight of the entire amount of the polymer and the (meth)acryl-based compound in the polymer membrane composition. Maintaining the amount of the UV polymerization initiator at about 1 to about 10 parts by weight may help ensure a sufficient cross-linking degree while also preventing non-uniformity, e.g., gel-generation, phase separation, and the like, in the polymer membrane composition, thus preparing a polymer membrane having uniform properties and a good appearance.

(C2) Thermal Polymerization Initiator

In another implementation, the polymer membrane composition may include a thermal polymerization initiator producing a radical, when a thermal polymerization reaction is performed, to cross-link the polymer and the (meth)acryl-based compound.

The thermal polymerization initiator may include, e.g., organic peroxides such as dialkylperoxide, diacylperoxide, benzoylperoxide, and the like, hydroperoxides such as cumylhydroperoxide, and the like, azo compounds such as azobisisobutyronitrile (AIBN), azomethane, azoisopropane, and the like, and metal alkyls such as ethyl silver and the like. In an implementation, the azo-compound-based thermal polymerization initiator may have a wide range of initiation temperatures, e.g., about 40 to about 60° C., and may produce nitrogen gas when decomposed, so that the produced nitrogen may be measured to determine how much initial radical is produced.

The thermal polymerization initiator may be included in an amount of about 1 to about 10 parts by weight, based on 100 parts by weight of the polymer and the (meth)acryl-based compound in a polymer membrane composition. Maintaining the amount at about 1 to about 10 parts by weight may help prevent a micropore from being formed in a resultant polymer membrane due to, e.g., excessive discharge of nitrogen gas produced during its decomposition. In addition, maintaining the amount at about 1 to about 10 parts by weight may help ensure sufficient radicals for a cross-linking reaction, since oxygen in the air may react with the radicals.

Method of Manufacturing the Polymer Having a Carbon Double Bond-Containing Cross-Linkable Group and a Cation Exchange Group Hereinafter, a method of manufacturing the polymer having a cation exchange group and a carbon double-bond-containing cross-linkable group is described.

First, the polymer may be prepared by mixing polymerization monomers of the following Chemical Formulae 7 and 8 and diol compounds of Chemical Formulas 9 and 10 with a solvent and a base, e.g., potassium carbonate, and polymerizing the resultant composition.

[Chemical Formula 7]

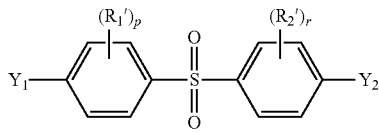

[Chemical Formula 8]

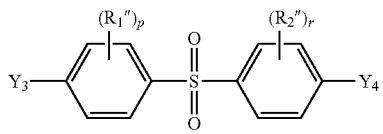

In Chemical Formula 7, $R_{1'}$ and $R_{2'}$ may each independently be, e.g., hydrogen, a C1 to C10 alkyl group, a C2 to C10 alkenyl group, a C6 to C20 aryl group, a nitro group, or an amine group. In Chemical Formula 8, $R_{1''}$ and $R_{2''}$ may each independently be, e.g., a sulfonic acid group, a phosphonic acid group, a carboxylic acid group, or a sulfoneimide group. In Chemical Formulae 7 and 8, p and r may each independently be integers of 0 to 4, provided that p and r are not both simultaneously zero (0), i.e., at least one of p and r is 1, 2, 3, or 4. In Chemical Formulae 7 and 8, $Y_1$, $Y_2$, $Y_3$, and $Y_4$ may each independently be a reactive group, e.g., Cl, F, Br, or I.

[Chemical Formula 9]

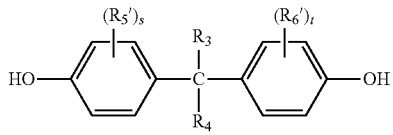

[Chemical Formula 10]

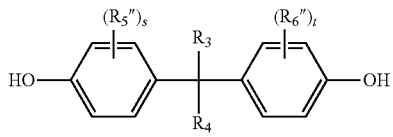

In Chemical Formulae 9 and 10, $R_3$ and $R_4$ may each independently be, e.g., hydrogen, —$CF_3$, a C1 to C20 alkyl group, a C2 to C20 alkenyl, a C6 to C20 aryl group, or a nitro group. In Chemical Formula 9, $R_{5'}$ and $R_{6'}$ may each independently be, e.g., hydrogen, a C1 to C10 alkyl group, a C6 to C20 aryl group, a nitro group, or an amine group. In Chemical Formula 10, $R_{5''}$ and $R_{6''}$ may each independently be, e.g., a C2 to C20 alkenyl group, such as vinyl, an allyl group, or a (meth)acryloyl group. In Chemical Formulae 9 and 10, s and t may each independently be integers of 0 to 4, provided that s and t are not both simultaneously zero (0), i.e., at least one of s and t is 1, 2, 3, or 4.

In an implementation, the polymerization monomer represented by the above Chemical Formula 7 may include, e.g., 4,4'-dichlorodiphenyl sulfone (DCDPS), 4,4'-difluorodiphenyl sulfone, and the like. In another implementation, the polymerization monomer represented by the above Chemical Formula 8 may include, e.g., sulfonated-4,4'-dichlorodiphenyl sulfone (s-DCDPS), and the like.

In an implementation, the diol compound represented by Chemical Formula 9 may include, e.g., bisphenol-A (BPA), and the like. In another implementation, the diol compound represented by Chemical Formula 10 may include, e.g., diallylbisphenol-A (DABPA), and the like.

The polymerization monomer represented by Chemical Formula 8 may be included in an amount of about 0.1 to about 0.7 mol, based on 1 mol of the entire amount of monomer represented by both Chemical Formulae 7 and 8. Maintaining the amount of the polymerization monomer represented by Chemical Formula 8 at about 0.1 to about 0.7 mol may have critical influences on ion conductivity of a polymer membrane.

The diol compound represented by Chemical Formula 10 having a carbon double-bond-containing cross-linkable group that can be cross-linked by, e.g., UV radiation or heat treatment, may be included in an amount of about 0.1 to about 0.7 mol, based on 1 mol of the entire amount of diol compounds represented by both Chemical Formulae 9 and 10. Maintaining the amount of the diol compound represented by Chemical Formula 10 at about 0.1 to about 0.7 mol may help ensure a high possibility for a cross-linking reaction while simultaneously avoiding gel formation in a resultant polymer membrane.

An entire amount of diol compounds represented by Chemical Formulae 9 and 10 may be about 0.1 to about 4 mol, based on 1 mol of the entire amount of the polymerization monomer represented by the above Chemical Formulae 7 and 8. Maintaining the amount of the diol compounds represented by Chemical Formulas 9 and 10 at about 0.1 to about 4 mol may help ensure good reactivity for polymerization.

The polymerization reaction may be performed at a temperature of about 100 to about 250° C., at which water produced during a nucleophilic reaction may be refluxed with toluene and removed. Then, the reactant may be cooled down and sequentially dipped in isopropyl alcohol (IPA) and distilled water as a work-up process, thus acquiring the polymer including a cation exchange group and a carbon double-bond-containing cross-linkable group.

Method of Manufacturing a Polymer Membrane for a Fuel Cell

Hereinafter, provided is a method of manufacturing a polymer membrane for a fuel cell using the polymer membrane composition according to an embodiment. The method of preparing a polymer membrane for a fuel cell using the polymer membrane composition may be performed through, e.g., an ultraviolet (UV) cross-linking process or a thermal cross-linking process.

When a polymer membrane is prepared through an ultraviolet (UV) cross-linking process, the polymer including a cation exchange group and a carbon double-bond-containing cross-linkable group and the (meth)acryl-based compound may first be dissolved in a solvent. Then, an ultraviolet (UV) polymerization initiator may be added thereto, thus preparing a uniform composition. Then, the solution may be coated on a substrate film. The coated substrate may be dried to evaporate the solvent in the polymer membrane composition and then irradiated with ultraviolet (UV) rays, thus preparing a polymer membrane for a fuel cell including a cross-linked polymer having a cation exchange group. The polymer membrane may be further dried after exposure to the ultraviolet (UV) radiation to, e.g., improve density. The cross-linked polymer membrane formed by ultraviolet (UV) radiation may include cross-links, e.g., between the polymer including a carbon double-bond-containing a cross-linkable group and the (meth)acryl-based compound, between the polymers including a carbon double-bond-containing cross-linkable group, and between the (meth)acryl-based compounds.

In an implementation, the coated polymer membrane may be dried after exposure to the ultraviolet (UV) radiation.

In another implementation, the coated polymer membrane may be first irradiated with ultraviolet (UV) rays, dried, and then irradiated with ultraviolet (UV) rays again.

The substrate film may include any suitable film for a substrate used for a polymer membrane for a fuel cell. In an implementation, the substrate film may include, e.g., a polyethyleneterephthalate (PET)-based film, a polyethylenenaphthalate (PEN)-based film, a polycarbonate (PC)-based film, a fluorine film such as polytetrafluoroethylene (TEFLON, DuPont), a polyimide-based film, a polyolefin-based film, or a film surface-treated with a releasing material. The substrate film may be, e.g., about 50 to about 150 μm thick.

When a polymer membrane for a fuel cell is prepared through a thermal cross-linking process, the polymer including a cation exchange group and a carbon double-bond-containing a cross-linkable group and the (meth)acryl-based compound may be dissolved in a solvent, and a thermal polymerization initiator may be added thereto, thus preparing a uniform composition. Next, the solution may be coated on a substrate film. Then, the substrate may be dried at a temperature of about 50 to about 150° C. for about 12 hours to evaporate the solvent included in the polymer membrane and to simultaneously initiate and execute a cross-linking reaction. When making a thin polymer membrane or increased productivity is desired, the coated substrate may be dried at a higher temperature for a shorter time. When making a thick polymer membrane or securing sufficient cross-linking is desired, the coated substrate may be dried for a longer time. Herein, the heat may dry the coated substrate and simultaneously produce a radical from the thermal polymerization initiator, initiating a cross-linking reaction. The cross-linked polymer membrane may include cross-links, e.g., between the polymer including a carbon double-bond-containing cross-linkable group and the (meth)acryl-based compound, between the polymers including the carbon double-bond-containing cross-linkable group, and between the (meth)acryl-based compounds.

The substrate film may include any suitable film for a polymer membrane for a fuel cell as described above with respect to the cross-linking process by ultraviolet (UV) radiation, and repeated description thereof is omitted.

In the method of manufacturing various cross-linked polymer membranes through ultraviolet (UV) cross-linking or thermal cross-linking, the polymer membrane may be aged at a temperature of about 50 to about 150° C. for about 1 to about 24 hours in order to remove remaining solvent and make the polymer membrane's cross-linking structure denser prior to being used for an MEA.

The polymer membrane for a fuel cell prepared through ultraviolet (UV) cross-linking or thermal cross-linking process may be peeled off from the substrate film. The peeled polymer membrane may be acid-treated with, e.g., sulfuric acid or the like, to, e.g., convert the cation exchange group from a salt into an acid. Then, the membrane may be used for an MEA.

The polymer membrane has no limit in its thickness. In an implementation, the polymer membrane may have a thickness of, e.g., about 20 to about 150 μm, depending on kinds and usage of a fuel cell. Maintaining the thickness of the polymer membrane at about 20 to about 150 μm may help ensure that the membrane is not so thin that it excessively transmits a fuel, while also maintaining durability. In addition, maintaining the thickness of the polymer membrane at about 20 to about 150 μm may help ensure that the membrane does not have excessively high ohm resistance after being prepared into an MEA, thus improving performance of a fuel cell. Accordingly, the thickness of the polymer membrane should be determined to fit characteristics required for a fuel cell, considering ion conductivity and fuel permeability.

A typical cross-linked polymer membrane for a fuel cell may be prepared by mixing, e.g., a base polymer or a (meth)acryl-based compound with no cation exchange group with a polymer having a cation exchange group. When this non-ion conductive compound is used for cross-linking, it may improve mechanical properties but deteriorate ion conductivity.

When a cross-linked polymer is prepared by mixing the (meth)acryl-based compound including a cation exchange group and a (meth)acryloyl group with the polymer including a cation exchange group and a carbon double-bond-containing cross linkable group, it may not only improve mechanical properties of a resultant polymer membrane but may also improve ion conductivity due to, e.g., the cation exchange group in the (meth)acryl-based compound.

Accordingly, when a polymer membrane composition is prepared by mixing the polymer including a cation exchange group and a carbon double bond-containing cross-linkable group and the (meth)acryl-based compound including a cation exchange group, it may exhibit better ion conductivity than a non-cross-linked polymer membrane and may simultaneously decrease permeability of a fuel, e.g., methanol, by regulating a mixing ratio of the polymer and the (meth)acryl-based compound.

Further, when a polymer membrane is prepared using a polymer membrane composition including the polymer including a cation exchange group and a carbon double-bond-containing cross-linkable group and the (meth)acryl-based compound including a cation exchange group, it may have better durability than one that is cross-linked only on the surface since it may have cross-linking through the entire polymer. A surface cross-linked polymer membrane may have deteriorated durability due to separation of inside and outside layers during long term operation of a fuel cell, since it may have a multi-layer structure of a core and inside and outside layers when cross-linked only on the surface. In addition, a polymer membrane may have various cross-linking degrees depending on the amount of a cross-linkable group included in the entire polymer. However, when the polymer membrane is cross-linked only on the surface, there is a limit in improving mechanical properties, since it may be difficult to regulate mechanical properties of the polymer membrane through surface treatment without changing the structure.

Membrane-Electrode Assembly (MEA)

According to another embodiment, an MEA may be prepared by coating each of a cathode catalyst and an anode catalyst layer on respective sides of a polymer membrane for a fuel cell, thus preparing a catalyst-coated-membrane (CCM). Then a gas diffusion layer (GDL) may be bonded at respective sides of the CCM.

In another implementation, the MEA may be prepared by coating cathode and anode catalyst slurries on a substrate film and then bonding the catalyst layers on respective sides of a polymer membrane. The substrate film may include a suitable substrate film, e.g., a releasing PET film, a polyimide film, or a polytetrafluoroethylene (TEFLON) film. The preparation may further include bonding a gas diffusion layer on respective sides of the CCM.

In still another implementation, each of the cathode or anode catalyst layer may be coated on one side of a gas diffusion layer to prepare a catalyst-coated-electrode (CCE) and respectively bonding the cathode CCE and the anode CCE at sides of the polymer membrane.

Figure 2:
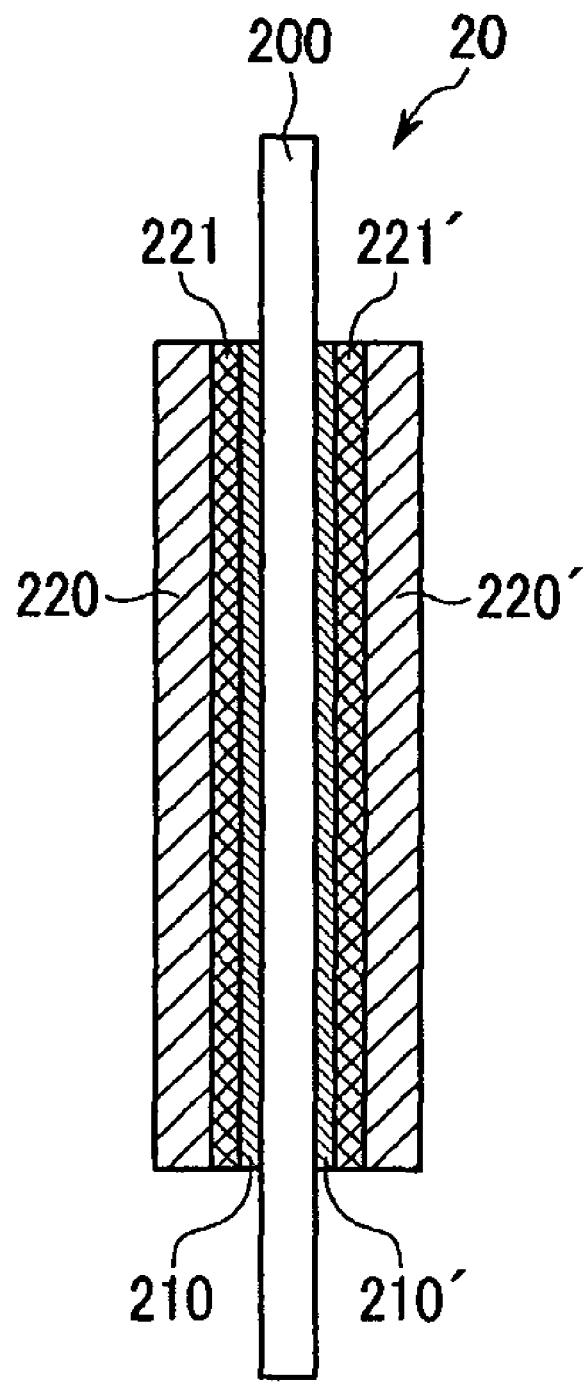
FIG. 2 illustrates a schematic diagram of a membrane-electrode assembly (MEA) including a polymer membrane prepared from the polymer membrane composition according to an embodiment.

FIG. 2 illustrates a schematic diagram of an MEA including a polymer membrane prepared from a polymer membrane composition according to an embodiment. Referring to FIG. 2, the MEA 20 may include catalyst-coated-membranes (CCM) 210 and 210' disposed or coated on respective sides of a polymer membrane 200, and gas diffusion layers 220 and 220' at respective sides of the catalyst-coated-membranes (CCM) 210 and 210'.

In another implementation the MEA 20 may include a polymer membrane 200 and a cathode and anode (CCE: catalyst-coated-electrode) including gas diffusion layers 220 and 220' and a catalyst layer coated on one side thereof and disposed at both sides of the polymer membrane 200.

The catalyst layers 210 and 210' may include a catalyst including, e.g., platinum, ruthenium, osmium, a platinum-ruthenium alloy, a platinum-osmium alloy, a platinum-palladium alloy, and/or a platinum-M alloy (herein, M may be one or more transition elements including, e.g., Ga, Ti, V, Cr, Mn, Fe, Co, Ni, Cu, and/or Zn). The catalyst may be used singularly, mixed with carbon black, or supported by a carbon carrier. The catalyst may be dispersed in a positive ion conductive polymer (ionomer) solution to prepare a slurry for forming a catalyst layer.

The gas diffusion layers 220 and 220' may play a role of facilitating 3-phase interface formation (catalyst-polymer membrane-fuel) by smoothly supplying the catalyst layers 210 and 210' with a fuel, e.g., methanol, ethanol, hydrogen, a hydrocarbon gas, and the like, and air or oxygen. The gas diffusion layers 220 and 220' may be prepared using, e.g., carbon paper or carbon cloth.

In addition, microporous layers (MPL) 221 and 221' may be further included between the catalyst layers 210 and 210' and the gas diffusion layers 220 and 220' to, e.g., adjust diffusion of fuel and oxygen.

Fuel Cell

A unit cell (single cell) of an embodiment may be fabricated by combining the MEA and a bipolar plate for a fuel cell.

The fuel cell may generate electricity as illustrated in FIG. 1. FIG. 1 illustrates a direct methanol fuel cell. Referring to FIG. 1, the direct methanol fuel cell may include, e.g., an anode 110, a cathode 130, and a polymer membrane 120 laminated together between a methanol and water supplier 100 and an oxygen supplier 140. In the direct methanol fuel cell, methanol ($CH_3OH$) and water ($H_2O$) as a fuel may be supplied from the methanol and water supplier 100 through the anode (fuel electrode) 110, and oxygen ($O_2$) may be supplied from the oxygen supplier 140 through the cathode (air electrode) 130.

The polymer membrane 120 may play a role of transferring protons ($H^+$) generated in the catalyst layer of the anode 110 to the cathode 130 and preventing cross-over of the fuel, e.g., methanol and water in a direct methanol fuel cell and hydrogen ($H_2$) in other fuel cells, supplied from the anode 110 toward the cathode 130 without ionization.

A fuel cell may have various electric power ranges depending on its usage. The unit cells may be stacked and fabricated into a fuel cell having a desired electric power.

Figure 3:
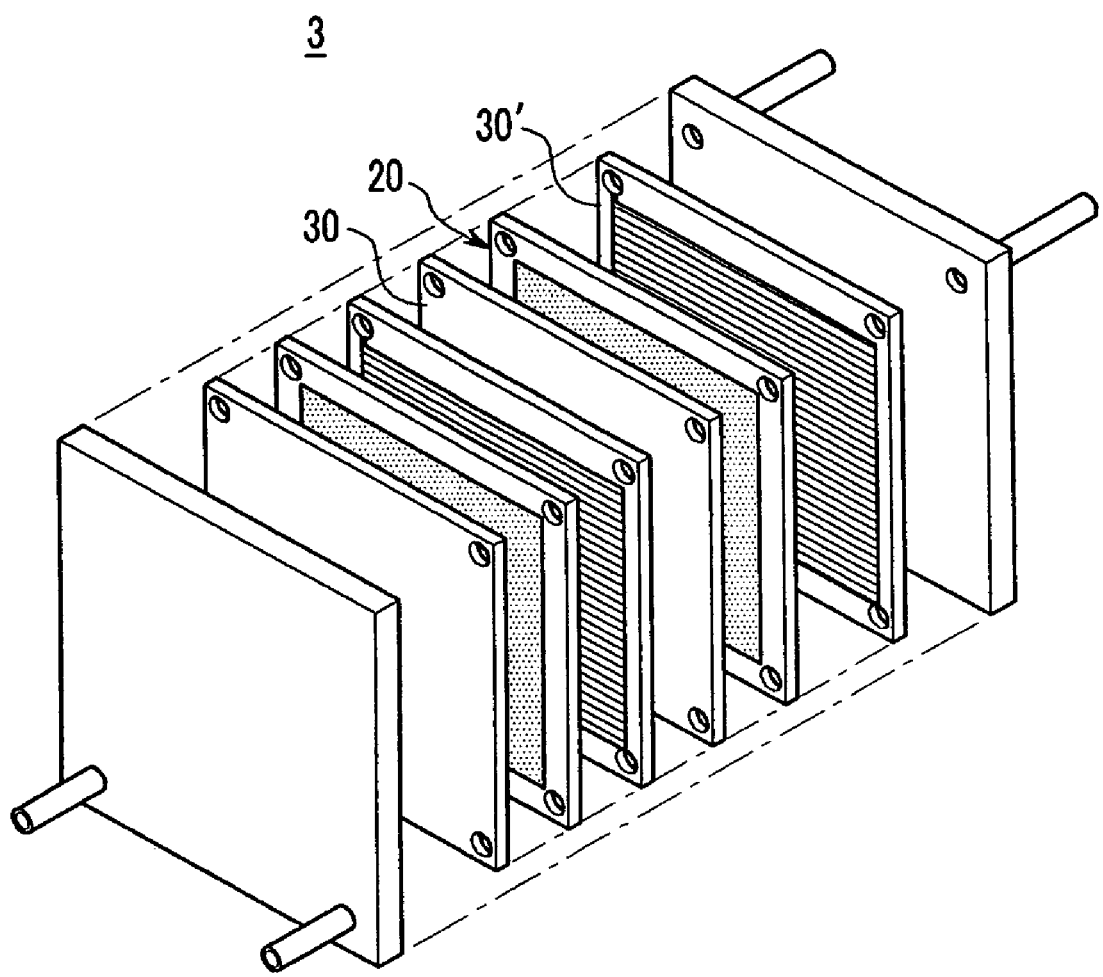
FIG. 3 illustrates an exploded perspective view of a fuel cell including a membrane-electrode assembly including the polymer membrane prepared from the polymer membrane composition according to an embodiment.

FIG. 3 illustrates a schematic exploded perspective view of a stack including the MEA of an embodiment. Referring to FIG. 3, a stack 3 for a fuel cell according to an embodiment may include, e.g., an MEA 20 and bipolar plates 30 and 30' disposed at respective sides of the MEA.

The following examples illustrate the disclosure in more detail. However, it is understood that the disclosure is not limited by these examples.

EXAMPLES

Example 1

4,4'-dichlorodiphenyl sulfone (DCDPS), sulfonated 4,4'-dichlorodiphenyl sulfone (S-DCDPS, sodium salt type), bisphenol-A (BPA), and diallylbisphenol-A (DABPA) were dissolved in 120 mL of N-methylpyrrolidone (NMP) and 100 mL of toluene according to amounts provided in the following Table 1. Then, 0.5 mol of potassium carbonate was added thereto. The resulting product was reacted at 180° C. for 8 hours, preparing polyarylethersulfone (DA-PAES) having a cation exchange group and a carbon double bond containing cross-linkable group and represented by the above Chemical Formula 3 (number average molecular weight (Mn)=600,000).

TABLE 1

|  | DCDPS | S-DCDPS | BPA | DABPA | Content of cation exchange group* | Content of cross-linkable group** |
|---|---|---|---|---|---|---|
| Mole number | 0.35 | 0.15 | 0.375 | 0.125 | 1.1 mmol/g | 1.0 mmol/g |
| Mole ratio | 7 | 3 | 7.5 | 2.5 | | |

*The content of a cation exchange group = the mol number of a cation exchange group/polymer weight (the mol number of a cation exchange group = the mol number of S-DCDPS × 2)
**the content of a cross-linkable group = the mol number of a cross-linkable group/ploymer weight (the mol number of a cross-linkable group = the mol number of DABPA × 2)

100 parts by weight of the polyarylethersulfone (DA-PAES) polymer were dissolved in 200 parts by weight of dimethyl sulfoxide (DMSO), preparing a uniform solution. Then, 5 parts by weight of 3-sulfopropyl acrylate (SPA) as a (meth)acryl-based compound were dissolved in 80 parts by weight of DMSO, preparing a uniform solution. These two solutions were mixed and agitated together, and then 3 parts by weight of Irgacure 184 (Ciba Inc.) and 0.3 parts by weight of Irgacure 2100 (Ciba Inc.) as UV polymerization initiators were added thereto, finally preparing a polymer membrane composition for a fuel cell.

The composition was coated on an approximately 100 μm-thick PET film using a doctor blade method, and then dried at 120° C. for about 5 minutes in a hot drier. Then, the composition was irradiated with about 3000 mJ/cm$^2$ of ultraviolet (UV) rays in an ultraviolet (UV) radiation device to initiate an ultraviolet (UV) cross-linking reaction, preparing an approximately 70 μm-thick polymer membrane.

The polymer membrane was additionally dried for about 12 hours at about 100° C. to remove remaining solvent, dipped in a 1 M sulfuric acid aqueous solution and maintained at about 95° C. for about 4 hours, and then washed with deionized water (D.I. water), finally acquiring a polymer membrane for a fuel cell. The resultant polymer membrane was evaluated according to the following method. The polymer membrane was included in an MEA in order to evaluate unit cell performance of a fuel cell.

Example 2

A polymer membrane for a fuel cell was prepared according to the same method as Example 1, except for dissolving 10 parts by weight of 3-sulfopropyl acrylate (SPA) as a (meth) acryl-based compound in 80 parts by weight of DMSO.

Comparative Example 1

A polyarylethersulfone (PAES) polymer including no cross-linkable groups was prepared according to the same method as Example 1 using 0.5 mol of bisphenol-A (BPA), without diallylbisphenol-A (DABPA). Then, a polymer membrane composition was prepared without using a (meth) acryl-based compound and an ultraviolet (UV) polymerization initiator but rather by dissolving only the polyarylethersulfone (PAES) in DMSO. A polymer membrane for a fuel cell was prepared according to the same method as Example 1, except for omitting the ultraviolet (UV) radiation process.

Property and Unit Cell Performance Evaluation (1) Methanol Permeability

MeOH permeability was evaluated by measuring MeOH mol concentration change (dC/dt) per unit time when MeOH was diffused from a MeOH reservoir to a water reservoir at room temperature according to the following Equation 1, using a diffusion cell including the MeOH and water reservoirs.

$$P = (^\Delta C_B / ^\Delta t)(1/C_{Ai})(L/A)V_B$$ [Equation 1]

($^\Delta C_B / ^\Delta t$: mol concentration change per unit time, $C_{Ai}$: initial mol concentration of a MeOH reservoir, L: membrane thickness, A: membrane area, $V_B$: water of a volume reservoir)

Figure 6:
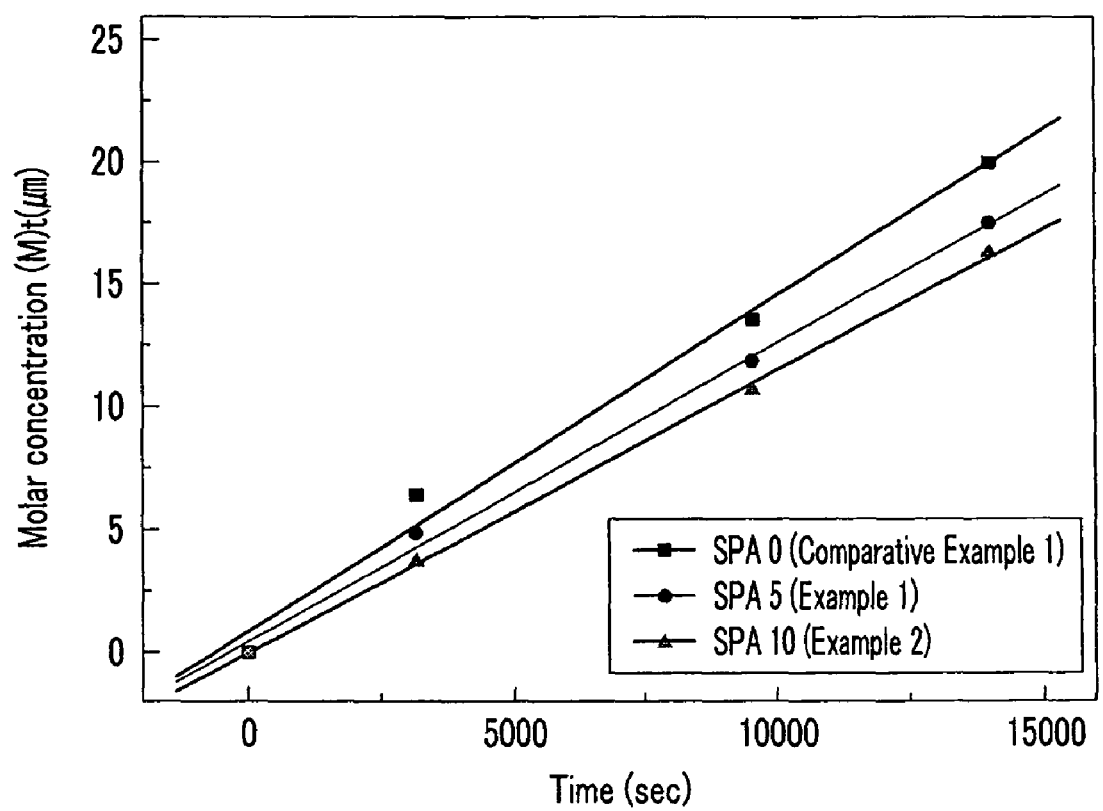
FIG. 6 illustrates a graph showing MeOH permeability results of the polymer membranes according to Examples 1 and 2 and Comparative Example 1, wherein the Y-axis is acquired by multiplying mol concentration of permeated MeOH by thickness of a polymer membrane.

Herein, the initial mol concentration of a MeOH reservoir was designated to be 1M. FIG. 6 illustrates a graph of how much MeOH permeated the polymer membranes of Examples 1 and 2 and Comparative Example 1 over time. The Y-axis in the graph was acquired by multiplying the thickness of a polymer membrane by MeOH mol concentrations.

(2) Ion Conductivity

Figure 7:
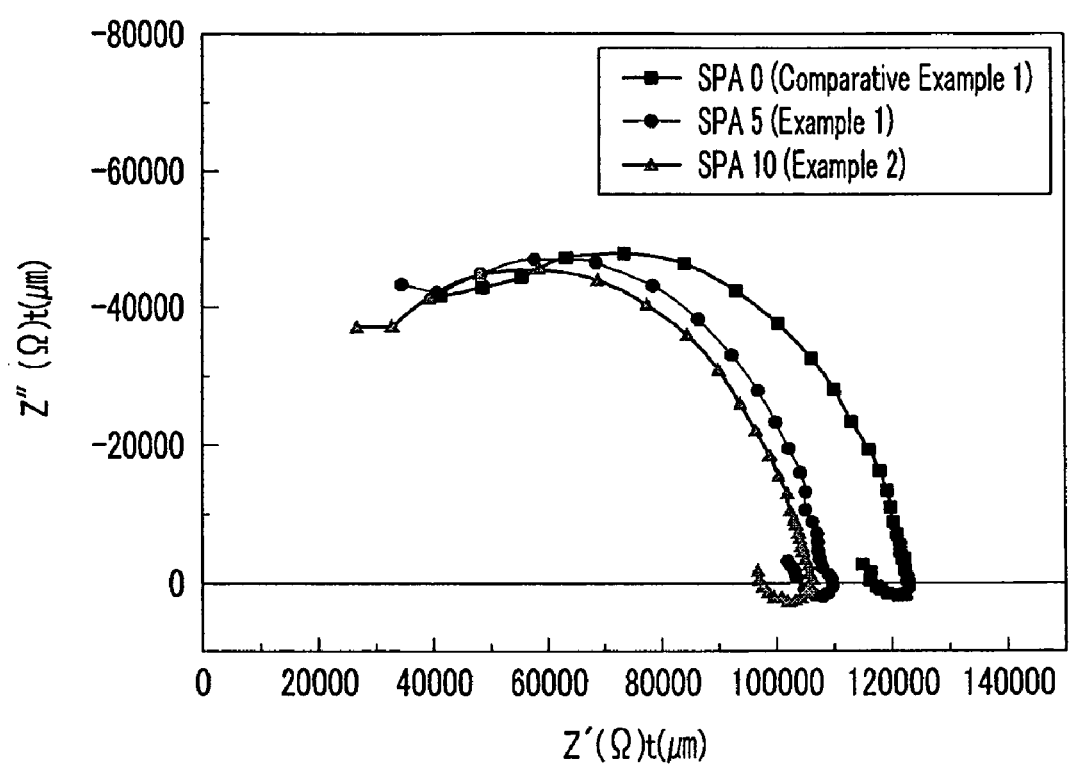
FIG. 7 illustrates a graph showing impedance measurements of the polymer membranes according to Examples 1 and 2 and Comparative Example 1, wherein the X-axis and Y-axis are respectively acquired by multiplying resistances of each real and imaginary number part of the impedance by thickness of a polymer membrane.

Ion conductivity was measured at room temperature using a 4-point probe method with an impedance analyzer after dipping the membrane in deionized water (D.I. water). The ion conductivity was calculated by acquiring a value at a point where a real number axis passed a complex plane of the impedance graph that showed resistance of a polymer membrane. FIG. 7 illustrates an impedance graph of impedance measurements of the polymer membranes of Examples 1 and 2 and Comparative Example 1. The X-axis and Y-axis respectively indicate values acquired by multiplying each resistance of real and imaginary number parts of impedance by the thickness of a polymer membrane.

$$\sigma = (1/R)(L/A)$$ [Equation 2]

(R: polymer membrane resistance, A: polymer membrane cross-sectional area, L: distance between a working electrode (W.E.) and a counter electrode (C.E.))

(3) Mechanical Properties

Figure 4:
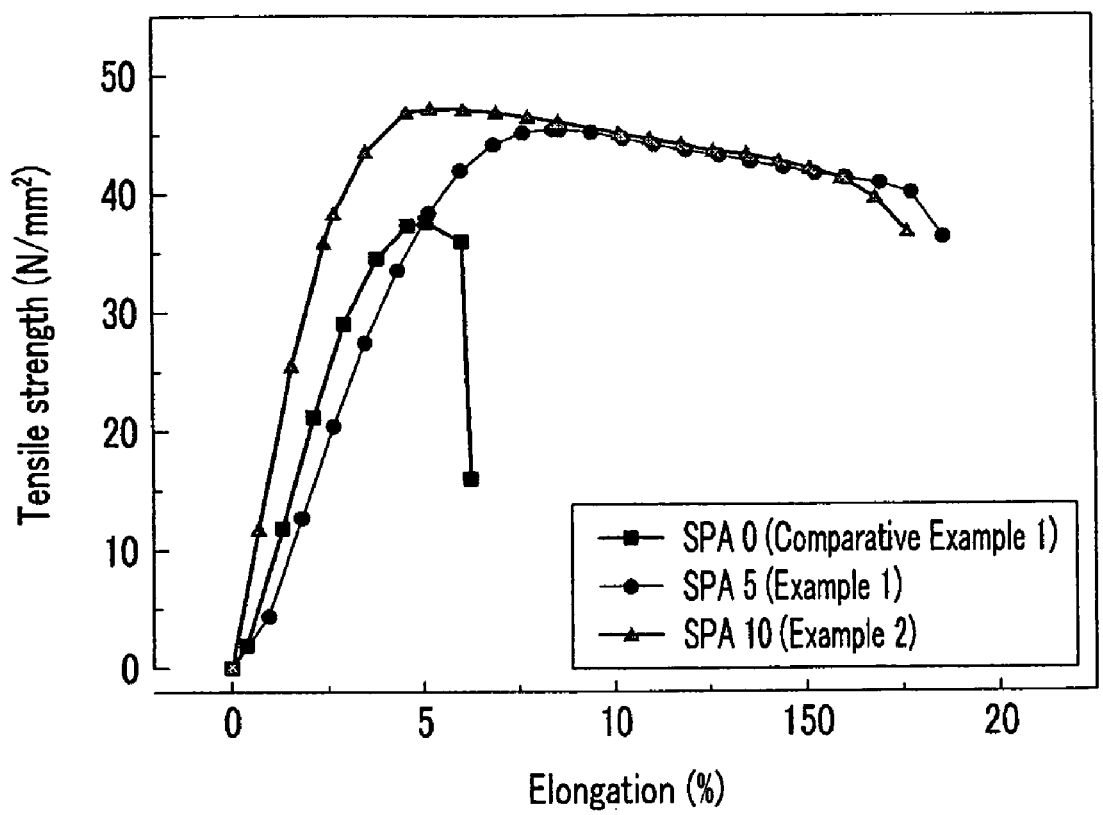
FIG. 4 illustrates a graph showing tensile strength and elongation results of the polymer membranes according to Examples 1 and 2 and Comparative Example 1.

The polymer membranes were measured regarding their mechanical properties using a tensile tester made by Instron Co. The polymer membrane was prepared as a specimen by drying and cutting it to be 5 mm wide and 30 mm long. The specimen was measured regarding tensile strength and elongation by setting a distance between grips holding the specimen at 10 mm and setting the speed at 50 mm/min. FIG. 4 illustrates tensile strength and elongation results of the polymer membranes according to Examples 1 and 2 and Comparative Example 1.

(4) Unit Cell Performance Evaluation

The polymer membranes according to Examples 1 and 2 and Comparative Example 1 were bar-coated on one side with a PtRu black catalyst (HiSpec 6000, Johnson Matthey Co.) slurry and dried, disposing a 2 mg PtRu/cm² anode catalyst layer. Then, a Pt black catalyst (HiSpec 1000, Johnson Matthey Co.) slurry was bar-coated and dried on the other side of the polymer membranes to form a 2 mg Pt/cm² cathode catalyst layer. As a result, a catalyst-coated membrane (CCM) with an electrode area of 10 cm² was prepared. Herein, while the polymer membrane was coated to have a catalyst layer, its other side was under vacuum so that it had no swelling. Next, an MEA was prepared by hot-pressing a gas diffusion layer (25BC, SGL Carbon Group) in two steps on respective sides of the CCM. The two step process included 1 minute of compression with 0.5 tons first and then 3 minutes of compression with one ton.

Then, the MEA was combined with a bipolar plate to fabricate a DMFC unit cell. The unit cell was evaluated regarding performance. It had an electrode area of 10 cm². The cathode was provided with air, while the anode was provided with 1 M methanol in a 2.5 stoichiometric method. Its temperature was maintained at 60° C. An I-V curved line was acquired, decreasing voltage from OCV (open circuit voltage) to 0.2 V at a speed of 1 mV/sec.

The results are provided in the following Table 2.

TABLE 2

|  |  | Example 1 | Example 2 | Comparative Example 1 |
|---|---|---|---|---|
| PAES polymer characteristic | Number average molecular weight (Mn) | About 600,000 | About 600,000 | About 600,000 |
|  | Content of sulfonic acid group | 1.15 mmol/g | 1.15 mmol/g | 1.19 mmol/g |
|  | Content of a cross-linkable group | 0.96 mmol/g | 0.96 mmol/g | 0.0 mmol/g |
| Polymer membrane composition | DA-PAES | 100 parts by weight | 100 parts by weight | — |
|  | PAES | — | — | 100 parts by weight |
|  | SPA | 5 parts by weight | 10 parts by weight | — |
|  | Irgacure 184 | 3 parts by weight | 3 parts by weight | — |
|  | Irgacure 2100 | 0.3 parts by weight | 0.3 parts by weight | — |
|  | DMSO | 280 parts by weight | 280 parts by weight | 280 parts by weight |

TABLE 2-continued

|  |  | Example 1 | Example 2 | Comparative Example 1 |
|---|---|---|---|---|
| Mechanical properties | Tensile strength [N/mm$^2$] | 45 | 47 | 38 |
|  | elongation [%] | 18 | 17 | 6 |
| Ion conductivity [S/cm] |  | 0.060 | 0.062 | 0.054 |
| (ratio)[1] |  | 111% | 115% | 100% |
| MeOH permeability [cm$^2$/sec] |  | $1.07 \times 10^{-6}$ | $0.94 \times 10^{-6}$ | $1.24 \times 10^{-6}$ |
| (ratio)[2] |  | 86% | 76% | 100% |
| Unit cell performance evaluation | I-V curved line (performance at 0.35 V) | 70 mA/cm$^2$ | 75 mA/cm$^2$ | 56 mA/cm$^2$ |

[1,2] relative ratio of properties of Comparative Example 1 including no SPA, a (meth)acryl-based compound As shown in Table 2, the non-cross-linking polymer membrane including no cross-linkable group and only including the polyarylethersulfone (PAES) polymer, according to Comparative Example 1, exhibited worse mechanical properties, e.g., tensile strength and elongation, than the polymer membrane including polyarylethersulfone (DA-PAES) including a cross-linkable group and SPA according to Examples 1 and 2, and accordingly, had deteriorated cell performance.

FIG. 4 illustrates a graph of the tensile strength and elongation results of the polymer membranes according to Examples 1 and 2 and Comparative Example 1 provided in Table 2. As described above, the polymer membranes including a polyarylethersulfone (DA-PAES) polymer including a cross-linkable group and SPA according to Examples 1 and 2 exhibited better mechanical properties than the polymer membrane including a polyarylethersulfone (PAES) polymer including no cross-linkable group, according to Comparative Example 1.

Figure 5A:
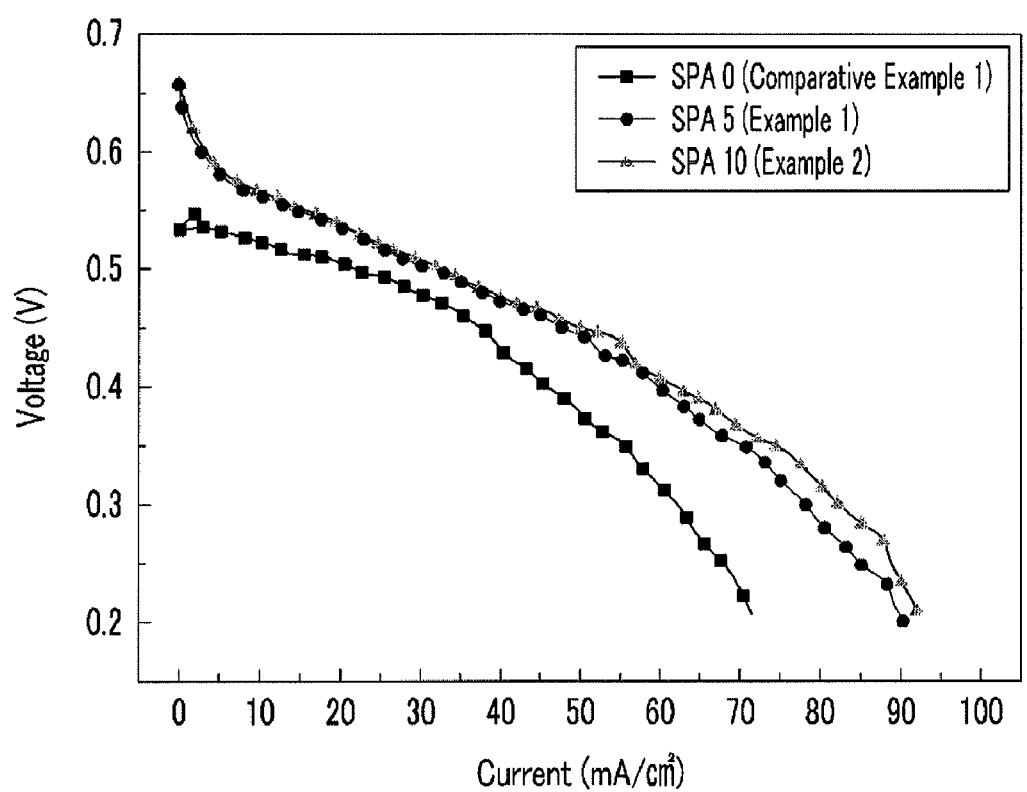
FIGS. 5A and 5B illustrate graphs showing performance results of unit cells including membrane-electrode assemblies according to Examples 1 and 2 and Comparative Example 1.
Figure 5B:
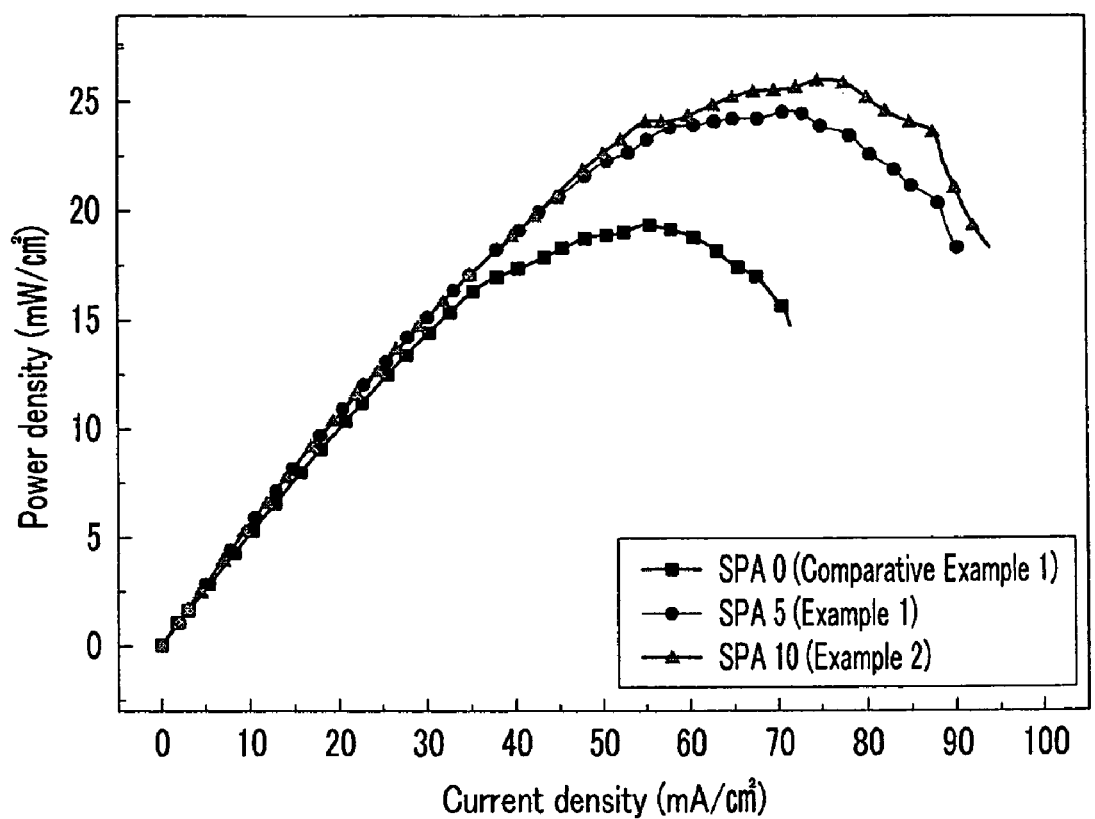

FIGS. 5A and 5B illustrate graphs of performance evaluations of a unit cell including MEA respectively including the polymer membranes according to Examples 1 and 2 and Comparative Example 1. Based on the performance evaluations of unit cells, performance of the unit cell including a polymer membrane prepared using the polymer membrane composition of Examples 1 and 2, due to the content of SPA, was improved.

FIG. 6 illustrates a graph of MeOH permeability results of the polymer membranes according to Examples 1 and 2 and Comparative Example 1. As illustrated in FIG. 6, the non-cross-linking polymer membrane of Comparative Example 1 exhibited higher MeOH permeability. In addition, the unit cell including the MEA including the non-cross-linking polymer membrane exhibited lower performance than the unit cell including the MEA including a cross-linking polymer membrane, due to increased MeOH permeability and deteriorated ion conductivity. When MeOH is increasingly permeated, a potential difference between an anode and a cathode may decrease, undesirably deteriorating OCV. The low ion conductivity may increase resistance of a polymer membrane and generate ohmic loss in an I-V curved line.

The cross-linking polymer membranes including polyarylethersulfone (DA-PAES) including a cross-linkable group and a cross-linked polymer of sulfopropylacrylate (SPA), a cross-linked polymer among polyarylethersulfones, and a cross-linked polymer among sulfopropylacrylates according to Examples 1 and 2 exhibited uniform cross-linking structures and thus excellent mechanical properties, compared with the non-cross-linking polymer membrane according to Comparative Example 1. As illustrated in FIG. 6, cross-linking polymer membrane according to Examples 1 and 2 also exhibited decreased MeOH permeability.

FIG. 7 illustrates a graph of resistance results of the polymer membrane including sulfopropylacrylate (SPA), as aforementioned. As illustrated in FIG. 7, since the polymer membranes according to Examples 1 and 2 had a cross-linking structures and included an ion conductive acryl-based compound (SPA), they exhibited lower resistances.

Figure 8:
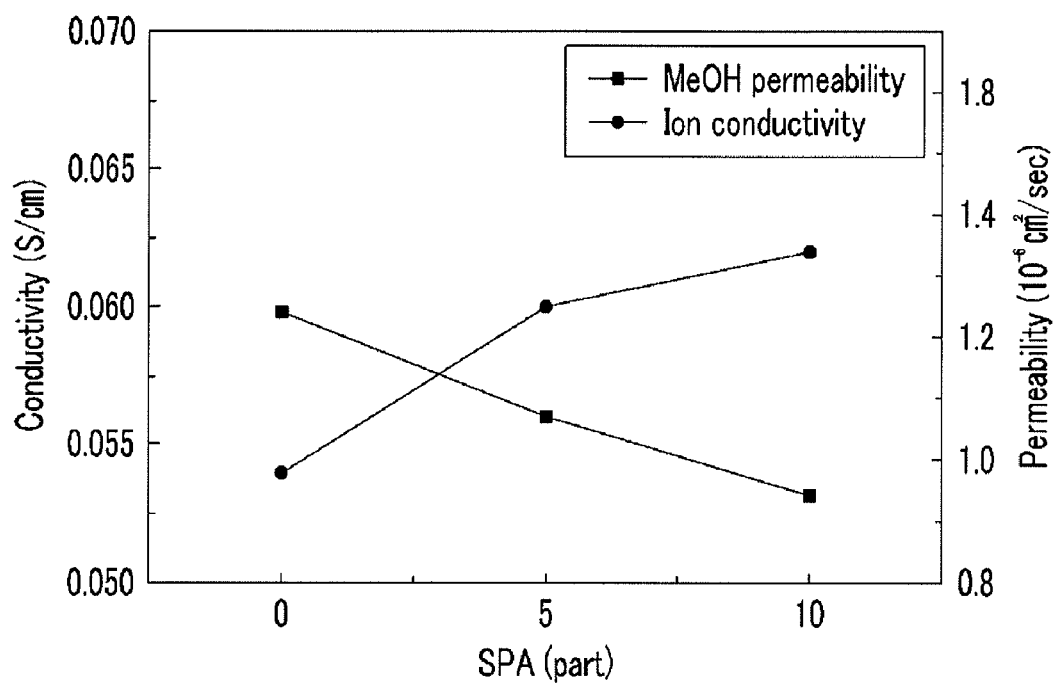
FIG. 8 illustrates a graph showing ion conductivity and fuel permeability characteristics of the polymer membranes according to Examples 1 and 2 and Comparative Example 1.

FIG. 8 illustrates a graph of ion conductivity and fuel permeability characteristics of the polymer membranes according to Examples 1 and 2 and Comparative Example 1. In a polymer membrane for a fuel cell, higher ion conductivity and simultaneously lower fuel permeability may bring about excellent performance. Referring to FIG. 8, in Examples 1 and 2, an ion conductive sulfonated acryl-based compound instead of a non-conductive compound was used to form a cross-linking structure with a polyarylethersulfone polymer, thus increasing ion conductivity as well as minimizing ion conductivity decrease.

The polymer membrane for a fuel cell may include a cross-linked polyarylethersulfone polymer membrane. When the polyarylethersulfone including cross-linkable group is synthesized into a membrane and used for a fuel cell, it may maintain sufficient thickness and mechanical properties as an increasing amount of cation exchange group is included. The polymer membrane may also exhibit sufficient dimension stability and mechanical properties, since water may not be increasingly absorbed, avoiding a swelling phenomenon. In contrast, such properties may not be afforded by non-cross-linked polymers as repeating units derived from a monomer including a cation exchange group are increasingly included, e.g., in an amount of about 50% or more.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polymer membrane composition for a fuel cell, the composition comprising:
a polymer, the polymer including a cation exchange group and a carbon double-bond-containing cross-linkable group;
a (meth)acryl-based compound, the (meth)acryl-based compound including a cation exchange group; and
a polymerization initiator,
wherein the polymer is represented by the following Chemical Formula 2:

[Chemical Formula 2]

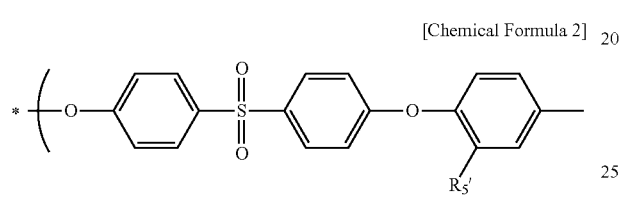

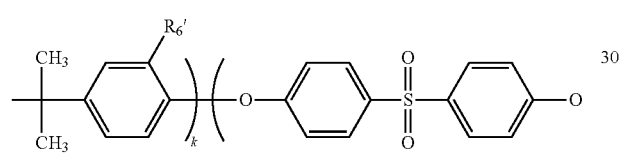

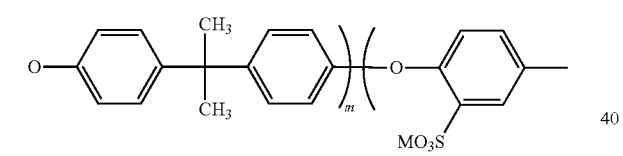

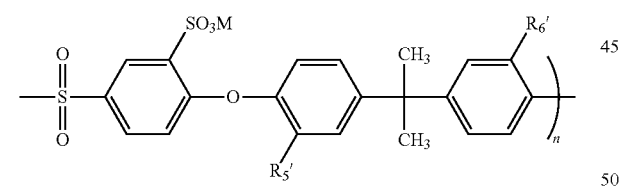

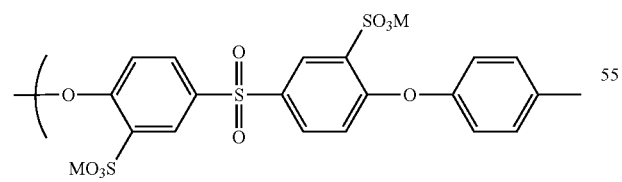

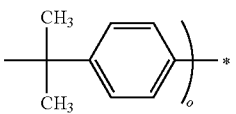

wherein, in Chemical Formula 2, $R_5'$ and $R_6'$ are each independently a C2 to C20 alkenyl or an allyl group, M is $Na^+$, $K^+$, or H, and k, m, n, and o indicate a mole number.

2. The polymer membrane composition as claimed in claim 1, wherein the cation exchange group is included in the polymer in an amount of about 0.3 to about 2.5 mmol/g.

3. The polymer membrane composition as claimed in claim 1, wherein the polymer has a number average molecular weight (Mn) of about 100,000 to about 1,500,000.

4. The polymer membrane composition as claimed in claim 1, wherein the (meth)acryl-based compound is represented by at least one of Chemical Formulae 4, 5, and 6:

[Chemical Formula 4]

[Chemical Formula 5]

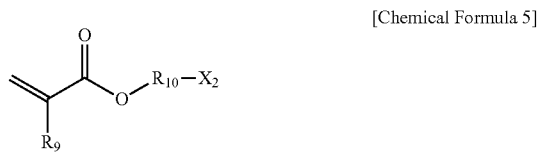

[Chemical Formula 6]

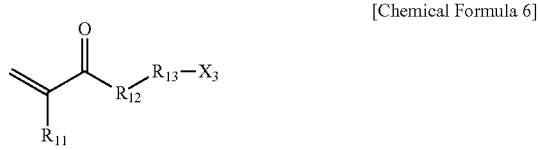

wherein, in Chemical Formulae 4, 5, and 6,
$R_7$, $R_9$, and $R_{11}$ are each independently hydrogen, a C1 to C20 alkyl group, a C2 to C20 alkenyl group, a C6 to C20 aryl group, a nitro group, or an amine group,
$R_8$, $R_{10}$, and $R_{13}$ are each independently a C1 to C20 alkylene group, a C6 to C20 arylene group, —NH—, or —NR— (R is a C1 to C10 alkyl),
$R_{12}$ is —NH— or —NR— (R is a C1 to C10 alkyl), and
$X_1$, $X_2$, and $X_3$ are each independently a sulfonic acid group, a phosphonic acid group, a carboxylic acid group, or a sulfoneimide group.

5. The polymer membrane composition as claimed in claim 1, wherein the (meth)acryl-based compound is a sulfonated (meth)acryl-based compound.

6. The polymer membrane composition as claimed in claim 1, wherein the (meth)acryl-based compound includes at least one of 3-sulfopropyl acrylate, 3-sulfopropyl methacrylate, and 2-acrylamino-2-methyl-1-propanesulfonic acid.

7. The polymer membrane composition as claimed in claim 1, wherein the (meth)acryl-based compound is included in an amount of about 1 to about 30 parts by weight, based on 100 parts by weight of the polymer including the cation exchange group and carbon double-bond-containing cross-linkable group.

8. The polymer membrane composition as claimed in claim 7, wherein the (meth)acryl-based compound is included in an amount of about 1 to about 20 parts by weight, based on 100 parts by weight of the polymer including the cation exchange group and carbon double-bond-containing cross-linkable group.

9. The polymer membrane composition as claimed in claim 1, wherein the polymerization initiator includes an ultraviolet (UV) polymerization initiator or a thermal polymerization initiator.

10. The polymer membrane composition as claimed in claim 1, wherein the polymerization initiator is included in an amount of about 1 to about 10 parts by weight, based on 100 parts by weight of the polymer and the (meth)acryl-based compound.

11. The polymer membrane composition as claimed in claim 1, wherein the carbon double-bond-containing cross-linkable group is included in the polymer in an amount of about 0.1 to about 3.0 mmol/g.

12. A polymer membrane for a fuel cell, comprising
    a cross-linked polymer produced through a cross-linking reaction of a polymer with a (meth)acryl-based compound including a cation exchange group, wherein the polymer is represented by the following Chemical Formula 2:

wherein, in Chemical Formula 2,
  $R_5'$ and $R_6'$ are each independently a C2 to C20 alkenyl or an allyl group,
  M is $Na^+$, $K^+$, or H, and
  k, m, n, and o indicate a mole number.

13. A membrane-electrode assembly (MEA), comprising:
    the polymer membrane as claimed in claim 12; and
    electrodes at respective sides of the polymer membrane, the electrodes including a catalyst layer and a gas diffusion layer.

14. A fuel cell, comprising:
    the membrane-electrode assembly as claimed in claim 13; and
    bipolar plates disposed at respective sides of the membrane-electrode assembly.

15. A method of manufacturing a polymer membrane for a fuel cell, the method comprising:
    providing a polymer membrane composition; the polymer membrane composition including:
      a polymer including a cation exchange group and a carbon double-bond-containing cross-linkable group,
      a (meth)acryl-based compound including a cation exchange group, and
      a polymerization initiator;
    coating the polymer membrane composition on a substrate; and
    cross-linking the polymer and the (meth)acrylic compound by activating the polymerization initiator,
    wherein the polymer is represented by the following Chemical Formula 2:

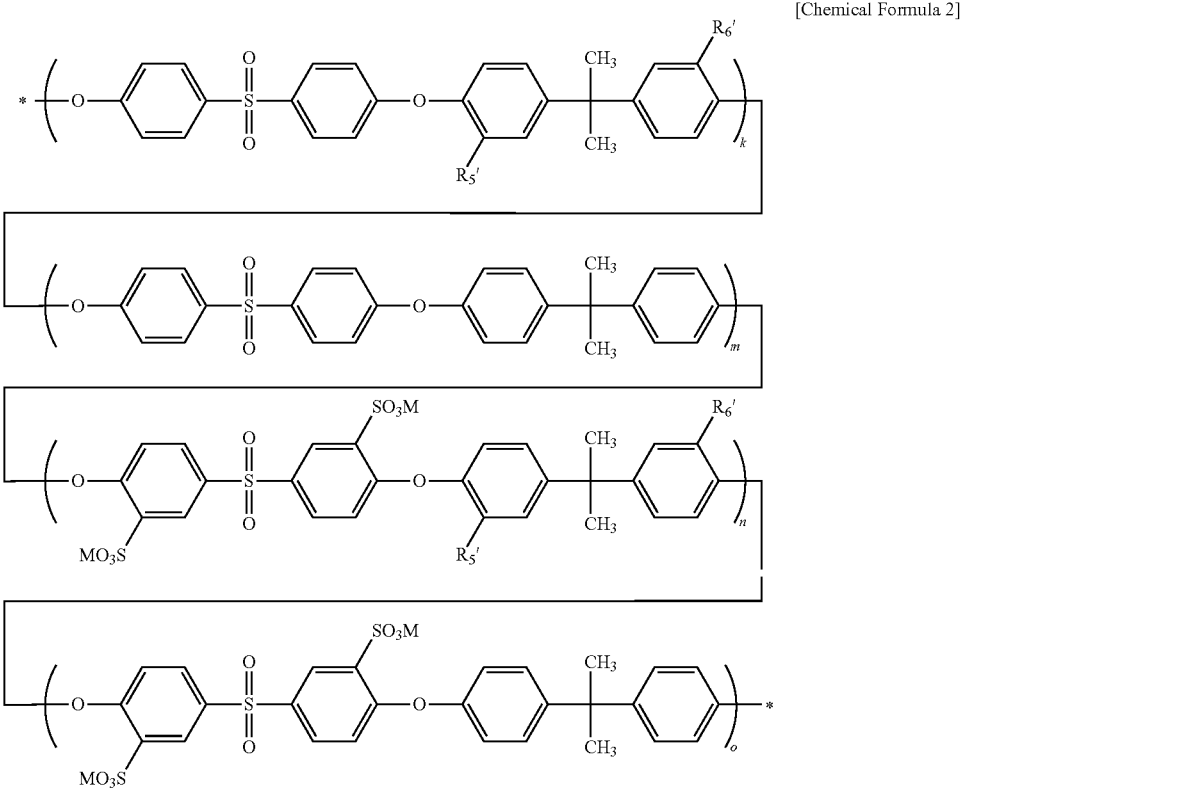

[Chemical Formula 2]
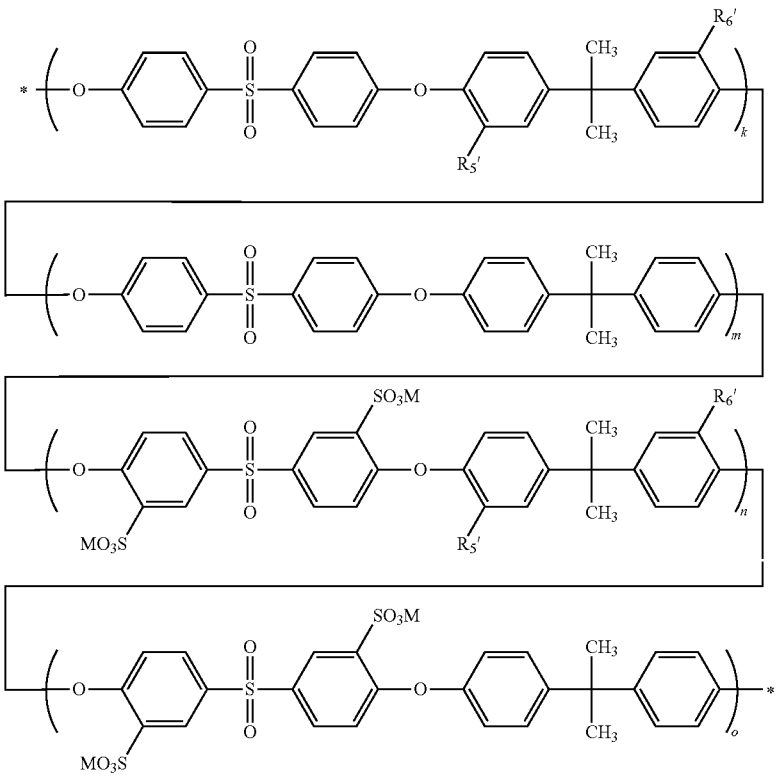
wherein, in Chemical Formula 2, $R_5'$ and $R_6'$ are each independently a C2 to C20 alkenyl or an allyl group, M is $Na^+$, $K^+$, or H, and k, m, n, and o indicate a mole number.
* * * * *